United States Patent

[11] 3,626,957

[72] Inventor Gian Carlo Balducci
 Via Conca d'Oro 287, Rome, Italy
[21] Appl. No. 49,104
[22] Filed June 23, 1970
[45] Patented Dec. 14, 1971
[32] Priority June 28, 1969
[33] Italy
[31] 38293 A/69

[54] AUTOMATIC APPARATUS FOR THE CONTINUOUS DEGREASING OF PADLOCK BODIES AND THE LIKE
 15 Claims, 5 Drawing Figs.
[52] U.S. Cl. ..................................... 134/104, 134/125, 134/126
[51] Int. Cl. ..................................... B08b 3/08, B08b 11/02
[50] Field of Search ........................................... 134/75, 104, 124, 125, 126

[56] References Cited
UNITED STATES PATENTS

| 691,355 | 7/1903 | Charlton | 134/125 |
| 734,063 | 7/1902 | Hauck | 134/126 X |
| 2,236,605 | 4/1941 | Ozouf | 134/125 X |
| 3,460,815 | 8/1969 | Corteggiano et al. | 134/125 X |

FOREIGN PATENTS

| 476,329 | 5/1929 | Germany | 134/125 |

Primary Examiner—Robert L. Bleutge
Attorney—Marshall & Yeasting

ABSTRACT: An apparatus for the continuous automatic degreasing of padlock bodies during the course of their production, and for the expulsion of shavings of brass from their holes. The apparatus comprises a tank of suitable configuration containing a degreasing liquid, in which the padlock are immersed by carrying bars and moved along an endless chain entrained around rotatable gearwheel, one of which is a driving gearwheel. A plurality of guide rails for regulating the orientation of said bars are provided in the tank.

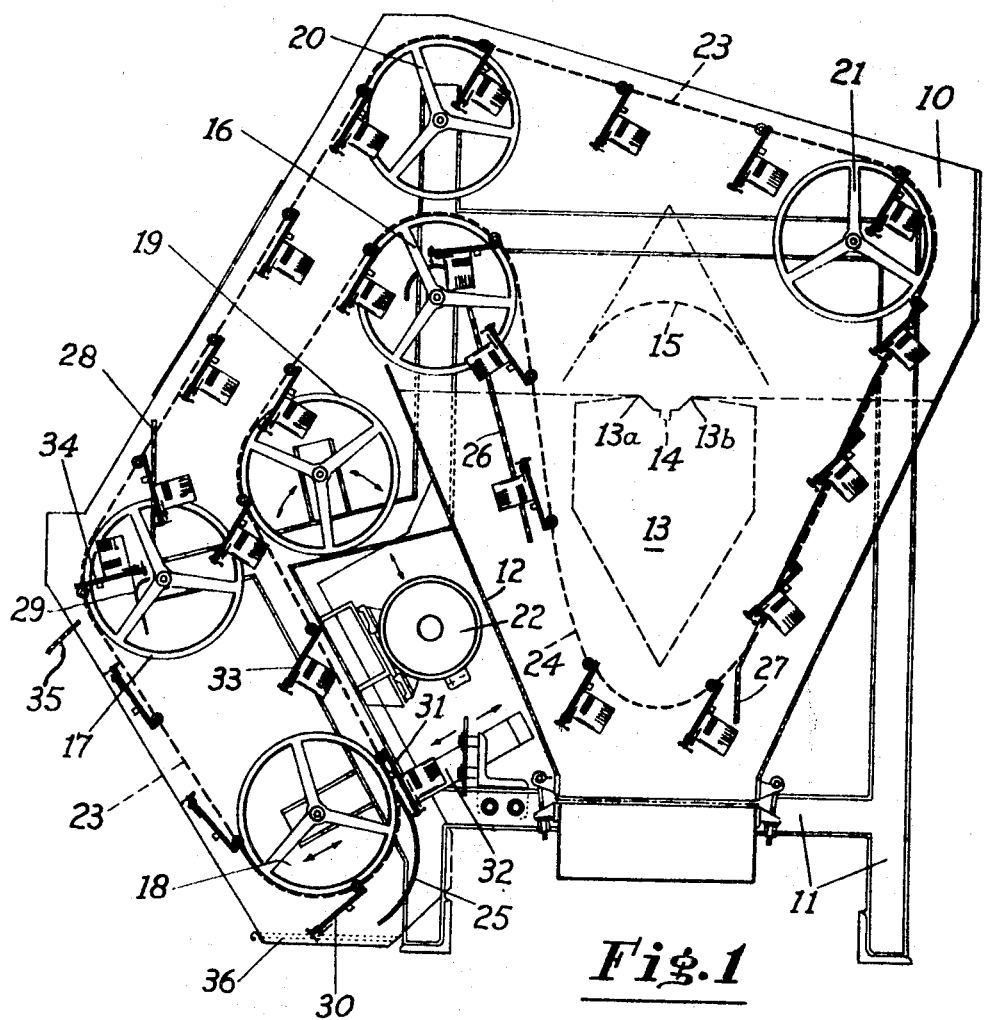
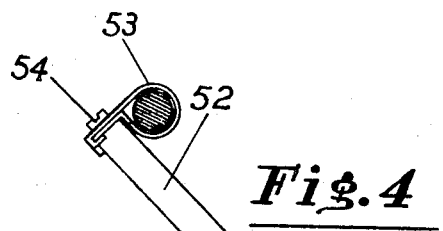
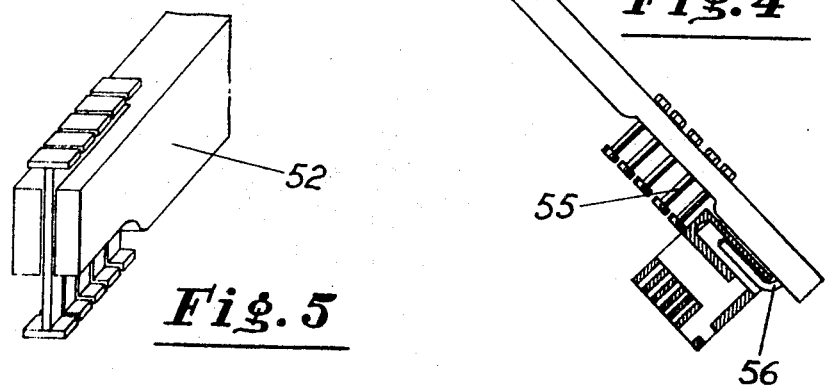
Fig.1
Fig.4
Fig.5

AUTOMATIC APPARATUS FOR THE CONTINUOUS DEGREASING OF PADLOCK BODIES AND THE LIKE

FIELD OF THE INVENTION

Padlock bodies conventionally comprise numerous large and small, intercommunicating or nonintercommunicating holes, which are formed by machining. It thus happens that the shavings from the machining operation remain in the holes and have to be totally expelled before proceeding to other manufacturing phases. Further, on the padlock surfaces inside and outside the holes, deposits of grease or other materials may form which have also to be eliminated before the successive manufacturing phases. The elimination of these deposits and the expulsion of the shavings are described by the one word "degreasing," but it is understood that a general cleaning operation in all senses is being dealt with.

BACKGROUND OF THE INVENTION

In order to carry out this cleaning, various systems well known to the experts of this field have been so far adopted. For example, examples of these are rotocleaning systems and the more simple system of immersing the padlock bodies contained in a basket with perforated base into a convenient liquid detergent. A more sophisticated system is that of immersing the padlock bodies in a tank containing a suitable liquid and to subject it to a field of ultrasonic vibrations, whose amplitude and frequency have been studied especially for the removal of the deposited particles and the expulsion of shavings.

None of the previous technical processes for the general cleaning of padlock bodies are completely satisfactory and they present numerous disadvantages. Firstly the whole cleaning operation in its overall aspect, i.e. the operations of immersion into the tank and dripping, give rise to excessive loss of time for each piece. In addition there is the fact that a high percentage of the pieces still contain shavings after leaving the cleaning bath, with consequently only partial recovery of the shavings from the bottom of the tank. It should also be noted that as the position of the pieces on leaving the bath is neither uniform nor rational, the quantity of degreasing liquid that is removed by the pieces themselves is excessive, thus making it necessary to frequently top up the liquid in the tank, in addition to the fact that the liquid so carried away could find itself present in places where it should not be and where it is often dangerous. Finally but not leastly, there is the disadvantage that the padlock bodies are cleaned in bulk and amassed in containers. This gives rise to the disadvantage that the padlock bodies dent each other and scratch each other at various points on their surface, their being made of brass which is a soft and easily scratchable material.

Having examined attentively the padlock body with its corresponding holes, it is evident that if a total and more or less immediate cleaning is required, there is no other solution than to make it assume determined positions during the cleaning phase, by moving it through a determined trajectory.

The main object of the present invention is thus the provision of an apparatus of continuous operation which avoids all the disadvantages mentioned above and which permits the degreasing of padlock bodies, facilitating the expulsion of shavings of brass or other metal from their holes. Said apparatus operates by total immersion and movement o the padlock bodies in a tank of suitable configuration containing a degreasing liquid, for example trichlorethylene, freon, chlorothene and the like, which are easily commercially available.

The particular advantages and characteristics of the invention will be evident from the following description with reference to the accompanying drawings, which show by way of example only some of the embodiments of the apparatus and its parts.

BRIEF DESCRIPTION OF THE DRAWINGS

In the drawings, in which like reference numerals indicate like parts:

FIG. 1 is a vertical lateral diagrammatic view of the apparatus according to the invention;

FIG. 4 is a diagrammatic lateral view of another embodiment of the padlock-carrying bar;

FIG. 5 is a variation of the bar of FIG. 4.

DETAILED DESCRIPTION OF THE INVENTION

Figure 3:
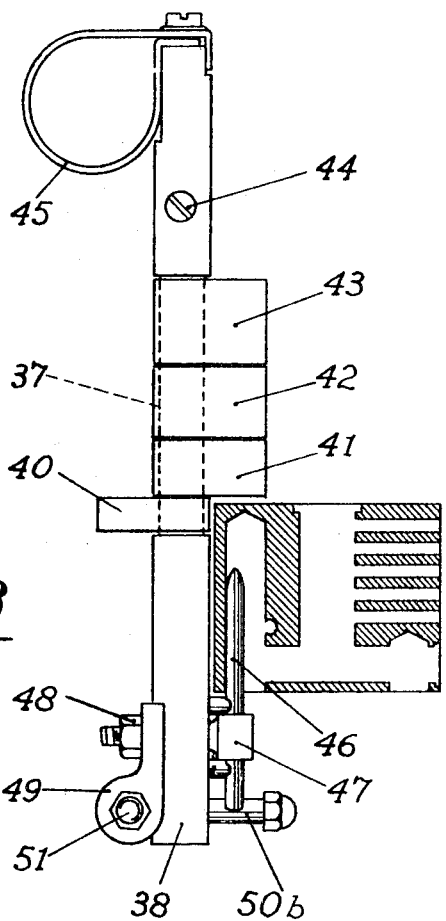
FIG. 3 is a lateral diagrammatic view of the padlock-carrying bar of FIG. 2 with a padlock body shown in section.

Referring to the drawings, FIG. 1 shows an overall view of the apparatus according to the invention. This comprises a box of polygonal profile 10 supported on a frame 11, in which a tank 12 containing the liquid detergent is formed. At the center of the tank 12 a smaller tank 13 is provided for the purpose of dividing the degreasing tank 12 into an inlet section and an outlet section for the padlock bodies. The dividing tank 13 comprises two upper overflow edges 13a and 13b for eliminating excess liquid and the foam which forms on its surface, which leave through the channel 14. Above the dividing tank 13 a hood 15 is provided which serves for condensing any vapors from the liquid detergent, the temperature of which may be made to rise to about 90° C. by a suitable heater.

A plurality of freely rotatable gearwheels and a driving gearwheel are mounted on the frame 11 of the apparatus. More precisely FIG. 1 shows five freely rotatable gearwheels 17, 18, 19, 20, 21 and a driving wheel 16 driven by a suitable motor reduction unit 22. A continuous endless chain 23 passes around the gear wheels 16 to 21 in such a manner as to define a closed broken trajectory in which the various sections of the broken trajectory between one gearwheel and the other are all straight and taut, with the exception of the section between the driving wheel 16 and the successive wheel 21, in which the chain forms a loop 24 downwards into the liquid so as to pass under the dividing tank 13. As will be described later, a series of bars carrying padlock bodies are coupled to the chain, the position of which is determined by a plurality of small guide rails 25, 26, 27, 28, 29, fixed to the frame 11 of the apparatus.

Before describing the operation of the apparatus, a description will now be given of the preferred embodiment of the padlock-carrying bars.

Figure 2:
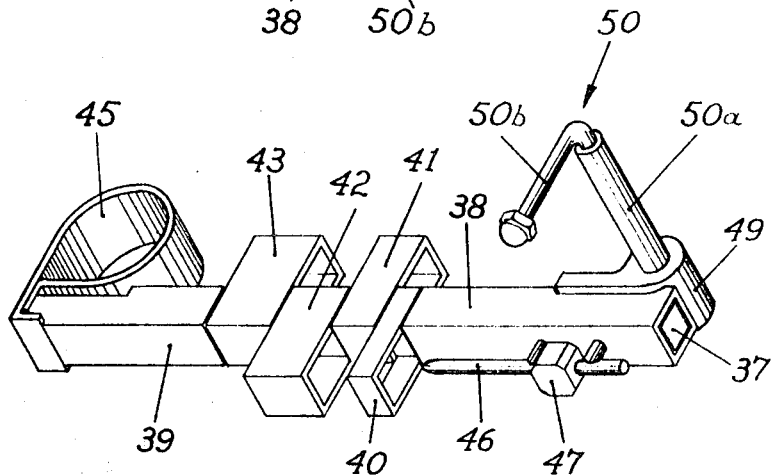
FIG. 2 is a perspective view of a bar for supporting padlock bodies which is used in the apparatus according to the invention.

From FIGS. 2 and 3 it is seen that each bar comprises a central core 37 on which two lengths of square tube 38 and 39 coupled without play are inserted. Although the core 37 and the tube lengths 38 and 39 are illustrated on the drawing with square section, it is understood that these may be made in other shapes, for example rectangular. The sections of square tube 38 and 39 are disposed at the extremities of the core 37 and are locked by the bolt 47 and the screw 44 respectively, in such a manner as to leave a central section of the core 37 uncovered. Before inserting the lengths of square tube 38 and 39, a plurality of rectangular slidable rings having a width equal to the width of the square tubes 38 and 39 and a much greater height, preferably double, are inserted on this free central section. Four rectangular rings 40, 41, 42, 43 are shown in FIGS. 2 and 3.

The bolt 47 provided with a locking nut 48 serves not only to lock the square tubular length 38 on the core 37, but also for fixing the robust pin 46 for hooking the padlock bodies, and for the fixing of the base element 49 for the L-foot 50. The bolt 47 together with the pin 46 form a hooking device for the padlock bodies. Both the pin 46 and the foot 50 are adjustable, the pin 46 being adjustable in the same manner as the point of a compass by means of slacking off the locking nut 48, while the L-foot 50 is adjustable by means of the screw 51.

A band 45 curved round is provided on the end of the bar opposite the end to which the L-foot 50 is fixed, by means of which the bar is coupled to suitable pivots fixed to the chain 23. The fundamental object of the bar is that of hooking the padlock body, locking it in order to avoid it falling during certain parts of the trajectory followed by the bar, then to unlock it at another point of the trajectory and successively to leave it free to fall through the outlet. From FIG. 3 it is seen that when the bar is inclined towards the left, all the sliding rings 40, 41, 42, 43 move towards the left and hence the pin 59 can hook a padlock body in the manner shown. It should be noted at this point that the width of the rectangular sliding rings 40 to 44 is equal to the width of the lengths of square tube 38 and 39 so that the padlock body can slide on the bar so that it is hooked and unhooked without interference.

When a padlock body has been hooked by the hooking pin 46 and the bar is inclined towards the right, some of the rectangular sliding rings, according to the size of the padlock body, move towards the right, locking the body of the padlock and preventing it from being unhooked.

The padlock body can be successively unlocked by capsizing the bar in such a way that the rectangular rings 40 to 43 move into the position corresponding to the rectangular ring 40 of FIG. 3, and in such a way that the padlock body can unhook itself and fall by gravity.

The practical operation of the bar in the apparatus illustrated in FIG. 1 will now be described.

A plurality of padlock-carrying bars are coupled to the chain 23 of the apparatus and each bar behaves in an identical manner to the others, occupying all the positions of the closed trajectory formed by the chain.

Consider now the bar 30 which is located at the lowest point of the trajectory and is entrained in movement by the chain 23. When the bar 30 arrives at the guide rail 25, the horizontal section 50a of the L-foot 50 comes into contact with the guide rail 25 and is guided by it. In this way the bar 30 arrives in the position of the bar 31 orientated parallel to the chain 23. At this point on the trajectory a chute in the form of a channel 32 is provided for loading the padlock bodies. The bar 31 has its hooking pin 46 pointing towards the loading chute 32 such that at the movement of passage the pin 46 can hook a padlock body which is positioned in the channel in such a way that its hooking hole is pointing towards the pin.

After disengaging from the guide rail 25 the bar is subjected only to the force of gravity and consequently assumes an inclination such as that of the bar 33 in which some of the rectangular sliding rings 40 to 43 move towards the right according to the size of the padlock body, so blocking it. Naturally inclination takes place always in the way shown in FIG. 1, even if the angle formed between the bar and the vertical may be different depending upon the weight and shape of the padlock bodies.

A guide rail 26 is provided at the driving gear wheel 16. When the bar arrives in this position, the extremity of the vertical length 50b of the foot 50 comes into contact with the guide rail 26 and is guided by this in such a way as to capsize the bar carrying the padlock body, by rotation in the clockwise direction about the coupling pivot. In this manner the padlock body is immersed in the first section of the tank 12 containing the detergent liquid, and cannot become disengaged from the bar because it is blocked by the rectangular rings 40 to 43. When the extremity of the vertical length 50b of the foot 50 leaves the guide rail 26, the bar resumes its preceding position rotating in the anticlockwise sense. This return to the freely hanging position takes place with oscillations which are more or less damped according to the viscosity of the detergent bath. The bar then travels through the loop 24 of the chain, its orientation remaining unaltered until the point in which the extremity of the length 50b of the foot 50 comes into contact with the guide rail 27. The bar is thus obliged to assume a different orientation, namely at 45°.

Referring to FIG. 1, it can be seen that the degreasing of the padlock bodies takes place at that part of the trajectory between the gearwheels 16 and 21 and that between the moment in which the padlock body enters the detergent liquid in the first section of the tank 12 (dirty bath section) and the moment in which it leaves the liquid detergent in the second section of the tank 12 (clean bath section), the bar undergoes a very wide rotation and consequently there is firstly the opportunity to make the air leave the holes while the padlock descends into the bath and secondly the opportunity for the holes in the padlock bodies to become turned downwards at an angle of 45°, in order to facilitate exit of the shavings. This movement also allows creation of liquid currents of different velocities between all the holes concerned and especially the lateral hole which communicates with the blind hole receiving the hooking pin 46. In this manner there in the practical certainty that not only the shavings but also those liquids (cutting oils) which are lighter or heavier than the bath liquid and which dissolve only with difficulty in it leave the holes.

It should also be noted that the guide rail 27 is made with an undulating surface so as to make the padlock body vibrate slightly and facilitate its cleaning and exit of the shavings. After leaving the guide rail 27, the bar reassumes its orientation of hanging under gravity and follows the chain around the gearwheels 21 and 20 so as to bring about dripping and drying of the padlock bodies.

When the bar arrives in the position of the guide rail 28, the horizontal length 50a of its foot 50 comes into contact with this rail and is guided by it. The guide rail 28 has a diverging layout with respect to the chain 23 by which while the foot 50 moves in a straight line along the guide rail 28, the coupling pin of the bar travels firstly through a straight section and then a curved section around the gearwheel 17. At the moment in which the horizontal length 50a of the foot 50 leaves the guide rail 28, the coupling pin of the bar is located lower, as seen in the case of the bar 34 in FIG. 1, and consequently it tends to fall while rotating in the clockwise direction, This fall continues until the said horizontal length 50a of the foot 50 comes into contact with the guide rail 29 disposed below the guide rail 28 at a slightly greater distance than the length of the vertical length 50b of the foot 50. The reason for this is to make the foot pass between one rail and the other.

As the foot follows the guide rail 28, the bar becomes inclined in the opposite direction and consequently the rectangular sliding rings 40 to 43 move towards the left (FIG. 3) and leave the padlock body free.

During the distance that the foot 50 follows the guide rail 29, the bar becomes completely capsized rotating in the anticlockwise direction, because of which the padlock body falls by gravity and is unloaded through the chute 35. The bar is then returned, sliding with the extremity of the foot 50 on the box wall into the position of the bar 30, ready for a new cycle. On the bottom of the box an extractable tank 36 is provided for collecting any shavings and deposits which have not fallen into the tank 12 containing the liquid detergent.

FIGS. 4 and 5 show another embodiment of the padlock carrying bar and a variation of it.

This bar consists of a rod 52 of nonconstant square section, which at one end comprises a band 53 curved round and fixed by means of a screw 54 or the like. Before being fixed by the screw 54, in a like manner to the first embodiment, the band 53 of each rod 52 is wound around the coupling pin on the chain 23, in such a manner that the bar 52 rotate around the coupling pins and be entrained by the chain.

A series of holes (5 in the drawings) are formed at spaced points in the bar 52 through which a similar number of bolts 55 are passes. The bolts 55 serve the same purpose as the rectangular sliding rings 40 to 43 in the preceding embodiment. These can slide freely in their holes and are disposed with their head downwards and their nut upwards. As seen in FIG. 4, the bars comprise an elongated indentation at a position corresponding to the holes for the bolts 55, such that when the bolts 55 are pushed from their head, their head arrives at the same level as the external surface of the bar 52. A hook 56 consisting of a pin bent in the form of an L is provided slightly to the side of the sliding bolts 55.

The variation shown in FIG. 5 is characterized by the fact that the bar 52 does not have holes for the passage of bolts but a single slit through which a series of rods 55 with a flat head of square or rectangular shape are inserted.

For all embodiments of the bar it should be noted that the distances between the various rectangular sliding rings 40, 41, 42, 43 for the various bolts 55 and the relative hooking device 46 to 56 are approximately equal to the heights of the bodies of the various types of padlock which can be degreased in the apparatus according to the invention. An advantage of the apparatus consists of the fact that during cleaning of the pieces they never come into contact one with the other and hence it is not possible for them to dent or scratch each other. From the operation point of view it should be noted that it is possible to make the liquid drip completely into the bath with considerable economy in the use of degreasing liquid or detergent, and that it is possible to totally recover the shavings which deposit on the bottom of the tank. From the point of view of the simplicity of the apparatus it should be noted that the body of the padlock after the bath is quite ready for the assembly of all other components of the padlock, without the necessity of a compressed air installation which was formally used for expelling any shavings remaining in any hole. The preferred embodiment of the apparatus according to the invention has been described, but it should be understood that in addition to the mentioned variations, other variations and modifications are possible which experts in the field will be able to devise, without leaving the field of protection of the invention.

The continuous automatic degreasing apparatus according to the invention is not limited to use only in the field of manufacture of padlock, but can be equally used in all fields in which small objects which have to be degreased or similarly treated in liquid baths without being damaged are handled.

What I claim is:

1. An automatic apparatus for the continuous degreasing of padlock bodies, comprising a frame 11 which supports a box 10 of polygonal profile; a tank 12 containing the detergent liquid; a plurality of freely rotatable gearwheels 17, 18, 19, 20, 21 and a driving wheel 16 driven by a motor reduction unit 22; a continuous endless chain 23 made to pass around said gearwheels 16-21, on to which a plurality of padlock-carrying bars are coupled; a plurality of guide rails 25, 26, 27, 28, 29 which regulate the orientation of said bars; said tank 2 containing a smaller tank 13 divides the degreasing tank 12 into an inlet section and an outlet section for the padlock bodies; said dividing tank 13 comprising two upper overflow edges 13a, 13b for eliminating excess liquid and foam by way of an offlet 14.

2. A degreasing apparatus as claimed claim 1, in which said continuous chain 23 is made to pass around gearwheels 16-21 in such a manner as to define a closed broken trajectory, in which the sections of chain 23 between the gearwheels are straight and taut, with the exception of the section between the driving wheel 16 and the successive wheel 21 in which the chain forms a loop 24 downwards into the liquid detergent, in such a way as to pass under the dividing tank 13.

3. A degreasing apparatus as claimed in claim 1, in which said bars are all equal and comprise: a core 37 of square section, on to which two lengths of square tube 38 and 39 coupled without play are inserted and a plurality of rectangular sliding rings 40-43; a hooking device 46, 47 for the padlock bodies, a resting foot 50, 50a, 50b and a coupling band 45.

4. A degreasing apparatus as claimed in claim 3 in which the lengths of square tube 38, 39 are disposed at the extremities of said bars, leaving an intermediate length uncovered on which said rectangular sliding rings 40-43 are inserted.

5. A degreasing apparatus as claimed in claim 3, in which said lengths of square tube 38, 39 and said rectangular sliding rings 40-43 are of equal thickness and equal length, but the height of the rectangular rings is very much greater, preferably double that of the lengths of square tube.

6. A degreasing apparatus as claimed in claim 3, in which said hooking devices comprise a bolt 47, provided with a locking nut 48, and a hooking pin 46 which is adjustable in the manner of a compass point by means of slacking the locking nut 48.

7. A degreasing apparatus as claimed in claim 3, in which the distances between the hooking element 47 and the rectangular sliding rings 40-43 are approximately equal to the heights of the various types of padlocks to be treated in the apparatus.

8. A degreasing apparatus as claimed in claim 1, in which the first 25 of said plurality of guide rails 25, 26, 27, 28, 29 is disposed in such a manner as to guide the foot 50 of each bar in order to position the bar parallel to the chain 23 for the automatic hooking of the padlock bodies.

9. A degreasing apparatus as claimed in claim 1, in which the second 26 of said plurality of guide rails 25-29 is disposed in such a manner as to guide the foot 50 of each bar in order to capsize the bar into almost the vertical position, by rotation in the clockwise direction.

10. A degreasing apparatus as claimed in claim 1, in which the third 27 of said plurality of guide rails 25-29 is disposed in such a manner as to guide the foot 50 of each bar in order to compel the bar to incline itself at 45°.

11. A degreasing apparatus as claimed in claim 1, in which the fourth 28 and the fifth 29 of said plurality of guide rails 25-29 are disposed in such a manner as to guide the foot 50 of each bar in order to capsize the bar by rotation in the anticlockwise direction, in such a manner that the padlock body is free to fall by gravity into a discharge chute 35.

12. A degreasing apparatus as claimed in claim 1, in which said bars are all equal and comprise: a rod 2 of square section into which a plurality of bolts 55 are inserted in order to hold the padlocks tight; a hooking member 56 for the padlock bodies; a resting foot and a coupling band 52.

13. A degreasing apparatus as claimed in claim 12, in which said stop bolts 55 are inserted into a central zone of the bar which has a reduced height in order to form an indentation of depth equal to the height of the heads of the stop bolts 55.

14. A degreasing apparatus as claimed in claim 12, in which said hooking member comprises a pin 56 bent in the form of an L.

15. A degreasing apparatus as claimed in claim 12, in which the distances between the hooking member 56 and the various bolts 55 are approximately equal to the heights of the various types of padlock to be treated in the apparatus.

* * * * *